Jan. 10, 1961     L. W. COLE     2,967,917
CIRCUIT BREAKERS
Filed April 23, 1958     2 Sheets-Sheet 2
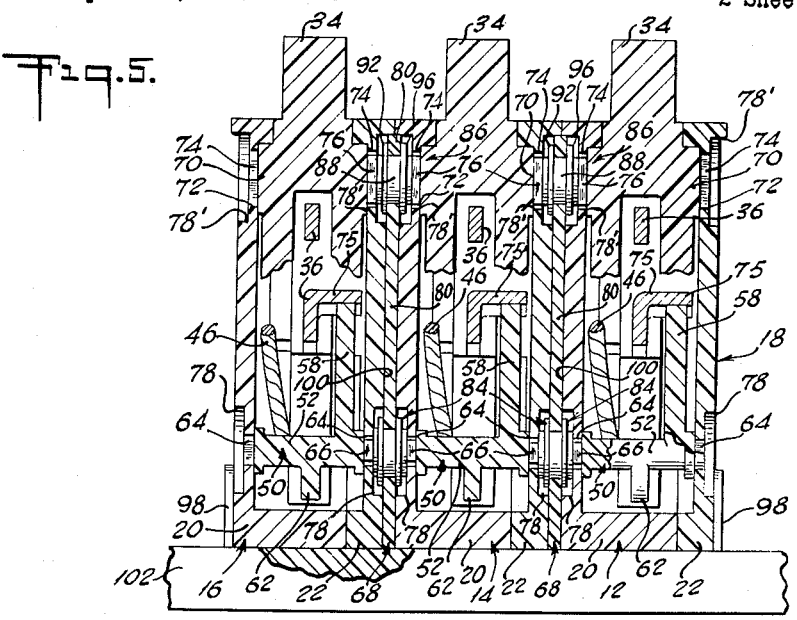
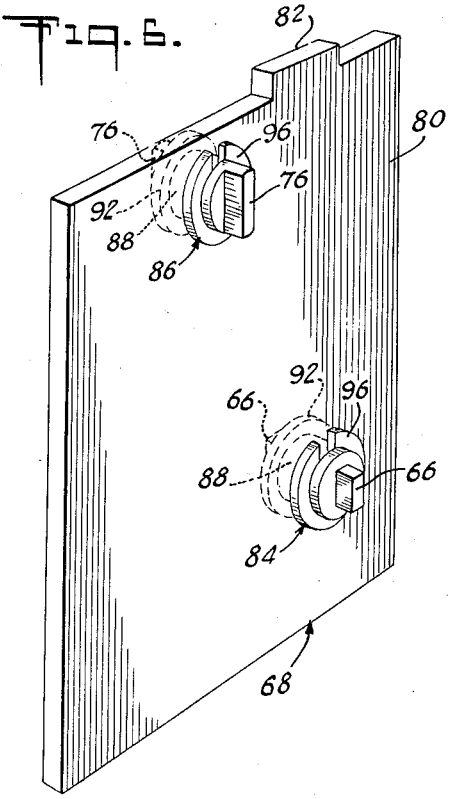
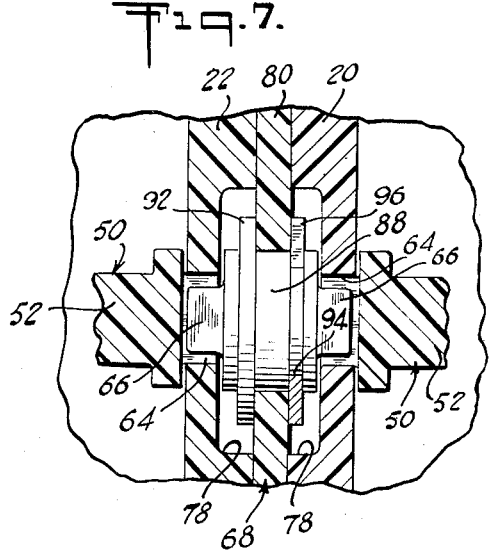
INVENTOR
LOUIS W. COLE
BY
ATTORNEY

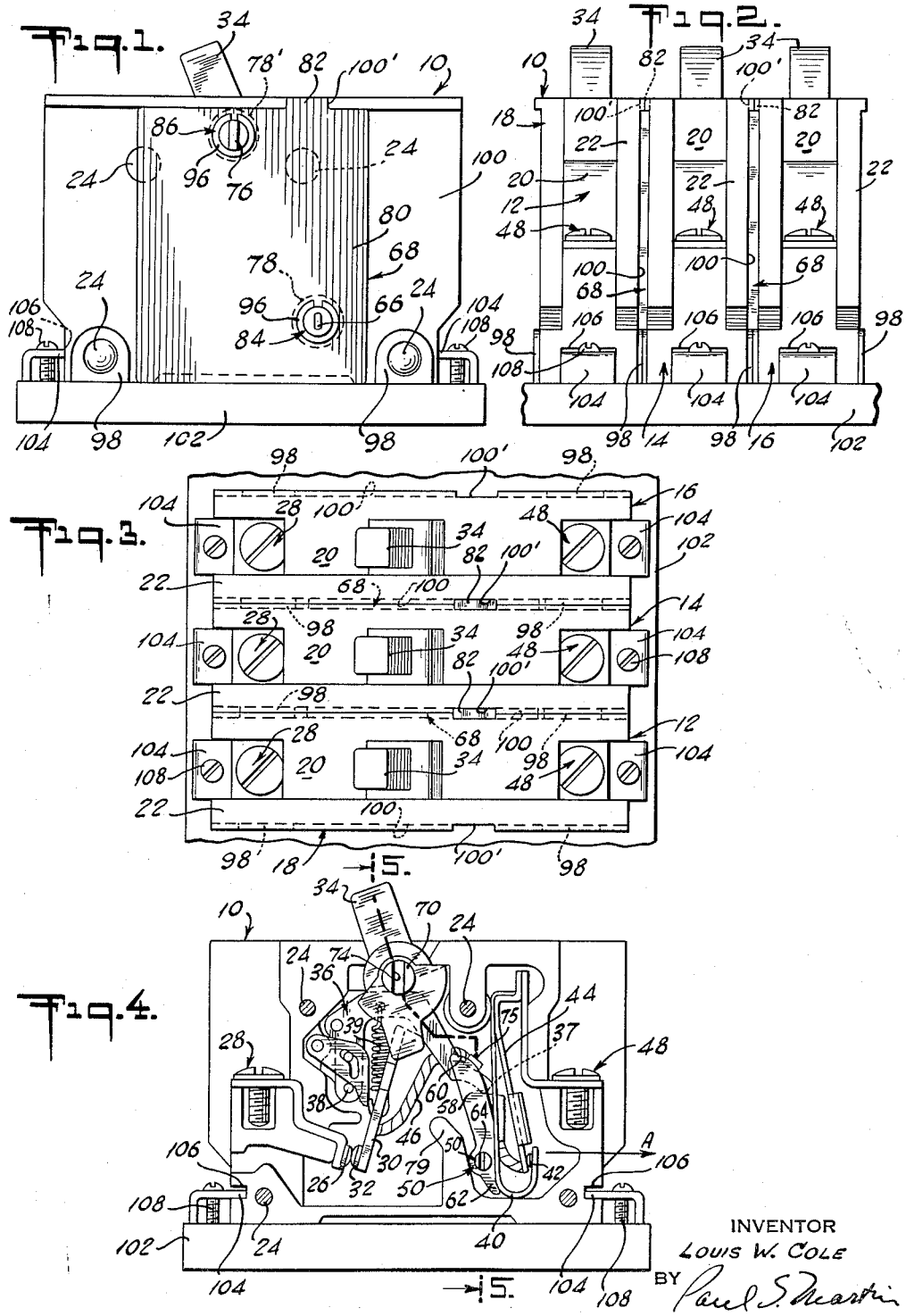

United States Patent Office 2,967,917
Patented Jan. 10, 1961

2,967,917

CIRCUIT BREAKERS

Louis W. Cole, Harrison, N.Y., assignor to Federal Pacific Electric Company, a corporation of Delaware Filed Apr. 23, 1958, Ser. No. 730,301

13 Claims. (Cl. 200—50)

This invention relates generally to a circuit breaker and, more particularly, to a circuit breaker which may be selectively used as an individual self-contained single-pole breaker or operatively interconnected with one or more companion breakers to form a multi-pole breaker, or any desired combination of single and multi-pole breakers.

My Patent No. 2,692,926, issued on October 26, 1954, for Multi-Pole Circuit Breaker, and assigned to the assignee hereof, shows that a number of single-pole circuit breakers may be interconnected to form a multi-pole breaker which is opened automatically at all of the poles upon the occurrence of an overload in the circuit at any one of the poles. An object of the present invention resides in the provision of single-pole circuit breakers and novel coupling means that may be inserted between such circuit breakers for effecting conjoint operation. In the illustrative embodiment this coupling means includes a locating support bearing a device for coupling the tripping elements of side-by-side single-pole circuit breakers; and more specifically this locating support carries coupling devices for both the tripping elements and the actuating handles of such side-by-side single-pole circuit breakers. When both coupling devices are on one and the same locating element, assurance is had that both the tripping elements and the operating handles of adjacent circuit breakers are coupled if either the tripping elements or the handles are coupled. Provision is also made for visually indicating the installation of such device so that the observer will know at a glance whether or not the breaker units are coupled.

The above and other objects, features and advantages of the present invention will be more fully understood from the following description considered in connection with the accompanying illustrative drawings.

In the drawings which illustrate the best mode now contemplated by me for carrying out the present invention:

Fig. 1 is a side view of a circuit breaker formed according to the present invention with a coupling device in position;

Fig. 2 is an end view of the circuit breaker showing a series of three individual breaker units operatively interconnected by a pair of coupling devices;

Fig. 3 is a top view thereof;

Fig. 4 is a view similar to Fig. 1 with the cover removed showing the circuit breaker in the closed condition thereof;

Fig. 5 is a sectional view taken on the line 5—5 of Fig. 4 with the tripping elements and actuating handles of a series of three individual breakers shown operatively interconnected;

Fig. 6 is an enlarged perspective view of a coupling device in accordance with the present invention; and Fig. 7 is a fragmentary enlarged sectional view illustrating the manner of coupling a companion pair of tripping elements by the coupling device.

Referring to the drawings in detail, the multi-pole circuit breaker 10 of the present invention, as illustrated, comprises the companion single-pole breakers 12, 14 and 16 which may be assembled for use as individual single-pole breakers or interconnected to form a multi-pole breaker. The breakers 12, 14 and 16 are of the general construction shown and described in the above referred to patent and differ therefrom in the respects to be described in detail hereinafter. The circuit breaker mechanism for each of the single-pole circuit breakers is contained within a casing 18 formed by a body part 20 and a cover 22 therefor, the casing being preferably of a molded plastics construction. The casing parts are secured together by rivets 24 or in any other suitable manner.

Contained within each casing 18 (Fig. 4) is a stationary contact 26 carried by a terminal 28, and a movable contact member 30 provided with a contact 32 engageable and disengageable with the stationary contact. The movable contact member is mounted for pivotal movement in the manually operable handle 34. A generally U-shaped actuating member 36 is mounted at one end thereof, for pivotal movement on the pivot pin 38, a spring 39 being connected between the member 30 and the member 36 to form a toggle arrangement therewith, said member 36 and spring constituting an operating mechanism for the movable contact member. At its free end the member 36 is provided with a portion 37 in normally latched engagement with a flexible latch member 40 formed of spring metal and provided at one end thereof with a part 42. The member 40, at the other end thereof, is bodily carried by and is suitably secured to a thermostatic element 44, constituted by a flexible bi-metallic strip. Latch member 40 and element 44 together constitute a trip device, the member 44 being electrically connected to the contact member 30 by the flexible conductor 46, one end of the bi-metallic strip being mounted on the terminal member 48 and the free end thereof abutting the part 42. It will be understood that upon the passage of a predetermined current through the member 44, the latter will flex in the direction of the arrow A in Fig. 4 to move part 42 in said direction. This movement will carry the flexible member 40 in an unlatching direction for unlatching the member 40 from member 36. Upon this unlatching member 36, under the tension of the overcentered toggle, pivots in a clockwise direction viewing Fig. 4, to reverse the toggle whereupon the movable contact member 30 is pivoted in a counter-clockwise direction for disengaging contacts 26 and 32, the circuit breaker mechanism assuming a tripped position as described in detail in the above referred to patent.

Pursuant to the present invention, each pole of the breaker is provided with a tripping element 50 which is preferably formed of a suitable insulating material. Element 50 comprises a generally cylindrical body portion 52 which is mounted for rotation in the casing. The casing part 20 and cover part 22 are provided with aligned bearing apertures 54 and 56, respectively, for mounting the opposite ends of element 50. The tripping element is provided adjacent one end thereof with an integral upwardly extending portion 58 provided with the cam forming marginal edge 60 and with a depending intermediate finger portion 62. The opposite ends of the tripping element are slotted as indicated at 64 for the reception of a companion fitting 66 of the coupling device 68 on the installation thereof between a companion pair of breaker units. Each handle 34 is provided with pivot portions 70 mounted in the aligned bearing recesses 72 provided in the casing. The portions 70 are slotted as indicated at 74, similar to slots 64, for the reception of a companion fitting 76 of the coupling device 68. Each casing is provided with external recesses 78 and 78' providing access to the slots or fittings 64 and 74, respectively.

With reference to Fig. 6, the coupling device 68 comprises a flat insulating plate 80 formed, for example, of a suitable plastics material, which has a projecting portion 82 at the top edge thereof. The plate 80 carries a pair of similar coupling members 84 and 86, each of which comprises a rotatable body part 88 which interfits in a companion aperture 90 of the plate. The body part 88 has an enlarged diameter flange 92 at one side thereof and a peripheral recess 94 at the opposite side thereof, said recess having a C-washer 96 snap engaged therein for mounting the coupling members on the plate. The rotatable body parts 88 of members 84 and 86 terminate in pairs of fittings 66 and 76, respectively, formed complementary to the slots 64 and 74, respectively. The circuit breaker units may be mounted in laterally adjacent face-to-face relation as independent self-contained units or each companion adjacent pair of units may be selectively coupled for multi-pole breaker operation by the installation of a coupling device 68 therebetween. When the breakers are thus mounted as independent self-contained units they are in face-to-face interfitting contact with the portions 98 of adjacent units disposed in interfitting relation and with a space 100 defined between the units to accommodate a coupling device. A companion adjacent pair of units may be coupled for multi-pole operation by the installation of a coupling device therebetween, the coupling members 84 and 86 thereof coupling the tripping elements and actuating handles, respectively, for conjoint and simultaneous operation. More particularly, in the installed condition of the coupling device the fittings 64 and 66 will be interconnected to couple the tripping elements and the fittings 74 and 76 will be interconnected to couple the handles 34, the coupling device filling the space 100 defined between the units. In such installed condition of the coupling device the portion 82 will interfit in the space 100' at the top of the units and will be visible from the top of the breaker units (Fig. 3) and thus the observer will know at a glance whether each adjacent pair of units is coupled. The fittings 64, 66 and 74, 76 may be of any desired construction and configuration and may be of different configurations for different breaker current ratings to prevent the interconnection of breaker units of different or non-corresponding current ratings.

The tripping elements and handles of each of the breaker units 12, 14 and 16 may be interconnected as shown in Fig. 5 to form a three-pole breaker by the installation of a pair of coupling devices. The adjacent pairs of units may be uncoupled by removing the interposed coupling devices whereby any combination of single-pole and two or three-pole units may be obtained with the multi-pole units in adjacent relation. More particularly, with a series of three breaker units as shown, three single-pole breakers may be formed, a three-pole breaker may be formed, or a single-pole and two-pole breaker combination may be formed in accordance with the condition of installation of the coupling devices.

In the circuit closed condition of the circuit breaker, the tripping element 50 is in set position wherein the finger portion 62 is inclined forwardly of the axis of body portion 52 to abut the lower end of the flexible latch member 40 as shown in Fig. 4, and the upwardly extending portion 58 is inclined rearwardly of said axis. The actuator 36 is provided with a laterally offset portion 75 in engagement with the cam surface 60 of portion 58. Upon the tripping of one of the circuit breaker mechanisms the actuator 36 is pivoted in a clockwise direction from the retracted latched disposition thereof and the portion 75 thereof moves downwardly along the cam surface 60 to rotate the tripping element 50 in a counterclockwise direction from its set position, and the portion 62 is rotated forwardly and upwardly from its set position as described in detail in the aforereferred to patent. The tripping elements which are interconnected as aforedescribed to form a multi-pole breaker are joined for unitary operation and all of the joined poles are tripped upon the tripping of one of the poles thereof.

More particularly, upon the tripping of any one pole upon the occurrence of a predetermined current in the circuit of said pole, the portion 58 of the companion tripping element is rotated rearwardly of the position illustrated in Fig. 4 by portion 75 of the companion actuator 36 whereby to rotate the interconnected tripping elements in a counterclockwise direction. As a result of said rotation, the portions 62 in the untripped interconnected circuit breaker units move from the position shown in Fig. 4 in a counterclockwise direction whereby to move the companion latch members 40 for disengaging the latter from the companion latching portions 37 for actuating the toggles of the untripped circuit breaker units to disengage the companion movable contact from the stationary contacts thereof. In such tripped condition the portions 75 of members 36 prevent the companion tripping elements 50 from rotating in a clockwise direction, the portions 58 thereof being in abutment with raised portions 79, respectively, of the casings. It will be noted that in such tripped condition the depending portions 62 will have moved the companion flexible members 40 sufficiently to disengage the respective parts 42 from the companion thermostat element 44.

Thus the handles 34 of the circuit breaker units may be selectively operative as independent units or interconnected for conjoint and simultaneous pivotal operation to correspond to the interconnection between the tripping elements of companion units forming a multi-pole breaker by the coupling devices. In Figs. 2 and 3, the handles of the units 12, 14 and 16 are shown interconnected to form a three-pole breaker, the handles being conjointly operative and therefore conjointly resettable after the tripping thereof. After tripping, the handles are moved to the Fig. 4 position to reengage the movable and stationary contacts of all the poles thereof as described in detail in the aforereferred to patent. Reference is also made to such patent for a more detailed description of the operating mechanism of the breaker units.

The desired number of circuit breaker units are mounted in laterally disposed relation upon the insulating plate 102, the latter having aligned hook elements 104 at the opposite ends thereof received in the recesses 106 of the casing. The elements 104 are detachably mounted to plate 102 by screws 108 to thereby provide for the detachable mounting of the breaker units to the plate. Thus the circuit breaker units may be mounted in laterally adjacent face-to-face relation with the tripping elements and handles selectively interengaged by the coupling device aforedescribed to obtain the desired single and/or multi-pole breaker combination. Any desired number of units may be mounted on the plate 102 to the capacity of the latter and where a multi-pole breaker is desired the tripping elements and handles of adjacent units of such breaker are operatively interconnected by the coupling device as described.

The provision of coupling device 68 incorporates both the coupling member for the handles and the coupling member for the tripping elements, as already explained. This is a feature that greatly facilitates the assembly of the coupling devices to the handles and the tripping elements of side-by-side single pole breakers. Additionally it provides assurance that in every case where the handles are coupled together, the tripping elements are also coupled together and conversely where the tripping elements are coupled to each other the handles are coupled together. This construction provides an important safeguard preventing inadvertent coupling of either the handles or the tripping elements alone. This construction makes it possible for single pole circuit breakers to be distributed, and guarantees that the user will properly couple both handles and tripping elements in every case where multipole operation is desired, free of error due to carelessness or misunderstanding of the requirements.

While there is shown and described herein certain specific structure embodying the invention it will be manifest to those skilled in the art that various modifications and rearrangements of the parts may be made without departing from the spirit and scope of the underlying inventive concept and that the same is not limited to the particular form herein shown and described except insofar as indicated by the scope of the appended claims.

Having thus described my invention what I claim as new and desire to secure by Letters Patent is:

1. A plurality of single-pole circuit breaker units mounted in laterally adjacent predetermined relation, each unit being self contained in its separate enclosure and provided with a circuit-breaker mechanism independently trippable upon the occurrence of predetermined current in the circuit thereof, said circuit-breaker mechanism comprising a movable contact member, an operating mechanism therefor and a trip mechanism operable to latch said operating mechanism in circuit-closed condition and to unlatch the same for operating said movable member to circuit-open condition upon said occurrence, the trip mechanism of each of said units including an externally accessible tripping element, and means insertable between the enclosures of said units providing a detachable connection between an adjacent pair of externally accessible tripping elements with said units in said predetermined relation to provide conjoint operation between the corresponding interconnected units, said means comprising a locating support bearing a coupling device insertable between said enclosures into laterally adjacent relation therewith.

2. A plurality of single-pole circuit breaker units mounted in laterally adjacent predetermined relation, each unit being self contained in its separate enclosure and provided with a circuit-breaker mechanism independently trippable upon the occurrence of predetermined current in the circuit thereof, said circuit-breaker mechanism comprising a movable contact member, an operating mechanism therefor and a trip mechanism operable to latch said operating mechanism in circuit-closed condition and to unlatch the same for operating said movable member to circuit-open condition upon said occurrence, the trip mechanism of each of said units including an externally accessible tripping element, and means insertable between the enclosures of said units providing a detachable connection between an adjacent pair of externally accessible tripping elements with said units in said predetermined relation to provide conjoint operation between the corresponding interconnected units, and an operating handle, and means insertable between the enclosures of said units providing respective detachable connections between an adjacent pair of operating handles to provide conjoint operation between the corresponding interconnected units and the desired single and multi-pole breaker unit combination, said means comprising a locating support insertable between said enclosures bearing a coupling device in alignment with said tripping elements and another coupling device in alignment with said handles.

3. In combination, plural side-by-side engaging single-pole casing enclosed circuit breaker units, each unit having an external actuating handle movable between spaced positions, said unit being self contained and provided with a circuit breaker mechanism independently trippable upon the occurrence of predetermined current in the circuit thereof, said circuit-breaker mechanism comprising a movable contact member, an operating mechanism therefor and a trip mechanism operable to latch said operating mechanism in circuit-closed condition and to unlatch the same for operating said movable member to circuit-open condition upon said occurrence, said trip mechanism and said operating handle having fittings accessible through lateral casing openings adapted for detachable connection with similar fittings of the engaging breaker to provide conjoint operation between the respective trip mechanisms and actuating handles, and a coupling device adapted to fit between the casings of said units in laterally adjacent relation therewith and including respective parts for detachably connecting said mechanism fittings and for detachably connecting said handle fittings to provide said conjoint operation, said coupling device having means visible at the top of said casing in the installed condition thereof, to indicate the coupled condition of said units.

4. A coupling device adapted to be received between the casings of a companion pair of similar single-pole circuit breaker units having external exposed tripping and operating handle fittings, said device comprising a member having a pair of spaced coupling members mounted for operation thereon, said coupling members each having fittings for making operative connection to said tripping and operating handle fittings, respectively, and engageable therewith for coupling said units for conjoint multipole operation.

5. A coupling device adapted to be received between the casings of a companion pair of similar single-pole circuit breaker units having rotatable axially accessible tripping and operating handle fittings, said device comprising a locating support, a pair of rotatable coupling members mounted thereon with the axes thereof parallel to each other and perpendicular to said support, said coupling members each having oppositely extending fittings for making keyed connection to said tripping and operating handle fittings, respectively, and engageable therewith for coupling said units for conjoint multipole operation.

6. A coupling device shaped to be detachably received in the space between the recessed casings of a companion pair of similar single-pole circuit breaker units having rotatable tripping and operating handle fittings accessible through casing openings, said device comprising a flat plate of insulating material having a pair of coupling members mounted at spaced locations thereon for rotation about respective axes perpendicular to the plane of said plate, said coupling members having at the opposite ends thereof fittings formed to make endwise slidable keyed connection to said tripping and operating handle fittings, respectively, and detachably engageable therewith for coupling said units for multipole operation.

7. A coupling device shaped to be detachably received between the casings of a companion pair of similar single-pole circuit breaker units having rotatable tripping and operating handle fittings accessible through casing openings, said device comprising a flat plate of insulating material having a pair of coupling members mounted at spaced locations thereon for rotation about respective axes perpendicular to the plane of said plate, said coupling members having key fittings at the opposite ends thereof for keyed connection to said tripping and operating handle fittings, respectively, and detachably engageable therewith for coupling said units for multipole operation, said plate having a top projection exposed at the top of the casings to indicate the coupled condition of said units.

8. A coupling device shaped to be detachably received between the casings of a companion pair of similar single-pole circuit breaker units having externally accessible tripping and operating handle fittings accessible through casing openings, said device comprising a flat plate of insulating material having a pair of coupling members mounted at spaced locations thereon, said coupling members having at the opposite ends thereof interlock fittings for operative connection to said tripping and operating handle fittings, respectively, and detachably engageable therewith for coupling said units for multipole operation, said plate having a top projection exposed at the top of the casings when installed to indicate the coupled condition of said units.

9. A plurality of single-pole circuit breaker units mounted in laterally adjacent predetermined relation, each unit being self contained and provided with a circuit breaker mechanism independently trippable upon the occurrence of an excess current in the circuit thereof, said circuit-breaking mechanism comprising an actuating handle, a movable contact member, an operating mechanism therefor and a trip mechanism operable to latch said operating mechanism in circuit-closed condition and to unlatch the same for operating said movable member to circuit-open condition upon said occurrence, each of said trip mechanisms including an externally accessible tripping element, respective coupling means for optionally establishing detachable connections between an adjacent pair of tripping elements and an adjacent pair of operating handles to provide conjoint operation between the corresponding interconnected units and the desired single and multipole breaker unit combination, and means interconnecting said respective coupling means to insure both connections being established when either is established.

10. A plurality of single-pole circuit breaker units mounted in laterally adjacent predetermined relation, each unit being self contained and physically a separate entity and provided with a circuit breaker mechanism independently trippable upon the occurrence of an excess current in the circuit thereof, said circuit breaker mechanism comprising an actuating handle, a movable contact member, an operating mechanism therefor and a trip mechanism operable to latch said operating mechanism in circuit-closed condition and to unlatch the same for operating said movable contact member to circuit-open condition upon said occurrence, each of said trip mechanisms including an externally accessible respective coupling means for optionally establishing detachable connections between an adjacent pair of said trip mechanisms and between an adjacent pair of said operating handles to provide conjoint operation between the corresponding interconnected units and the desired single and multipole breaker unit combination, and means additional to said externally accessible coupling means for establishing interconnection between said respective coupling means to insure both connections being established when either is established.

11. A plurality of single-pole circuit breaker units in accordance with claim 10 wherein said additional means is provided with a portion exposed to view when said units are assembled to indicate multipole relationship resulting from the coupled condition of said externally accessible coupling means.

12. A plurality of single-pole circuit breaker units mounted in laterally adjacent predetermined relation, each unit being self-contained and physically a separate entity and provided with a circuit breaker mechanism independently trippable upon occurrence of an excess current in the circuit thereof, said circuit-breaker mechanism comprising an actuating handle, a movable contact member, an operating mechanism therefor and a trip mechanism operable to latch said operating mechanism in circuit-closed condition and to unlatch the same for operating said movable contact member to circuit-open position upon said occurrence, each of said trip mechanisms including an externally accessible coupling means at opposite sides of the single pole circuit breaker unit for optionally establishing detachable connections between the trip mechanisms of each single pole circuit breaker unit and the next adjacent single-pole circuit breaker unit for causing tripping of both circuit breaker units when either is tripped, and means additional to said externally accessible coupling means establishing interconnection between said respective coupling means to insure both single-pole circuit breaker units being tripped when either is tripped, said last-named means having a portion exposed to view when the units are assembled to indicate the coupled condition of said coupling means.

13. A plurality of single-pole circuit breaker units mounted in laterally adjacent predetermined relation and means insertable between the enclosures of said units in accordance with claim 1 wherein a portion of said locating support is exposed to view when said units are assembled to indicate the multi-pole relationship resulting from the coupled condition of said externally accessible tripping elements.

References Cited in the file of this patent

UNITED STATES PATENTS

| | | |
|---|---|---|
| 590,695 | Alcorn | Sept. 28, 1897 |
| 1,297,912 | Rogers | Mar. 18, 1919 |
| 1,611,779 | Read | Dec. 21, 1921 |
| 1,825,159 | Pinkham | Sept. 29, 1931 |
| 2,166,555 | Rowe | July 18, 1939 |
| 2,403,868 | Lloyd | July 9, 1946 |
| 2,692,926 | Cole | Oct. 26, 1954 |
| 2,779,831 | Thomas | Jan. 29, 1957 |
| 2,824,191 | Christensen | Feb. 18, 1958 |